Figures 1, 2:
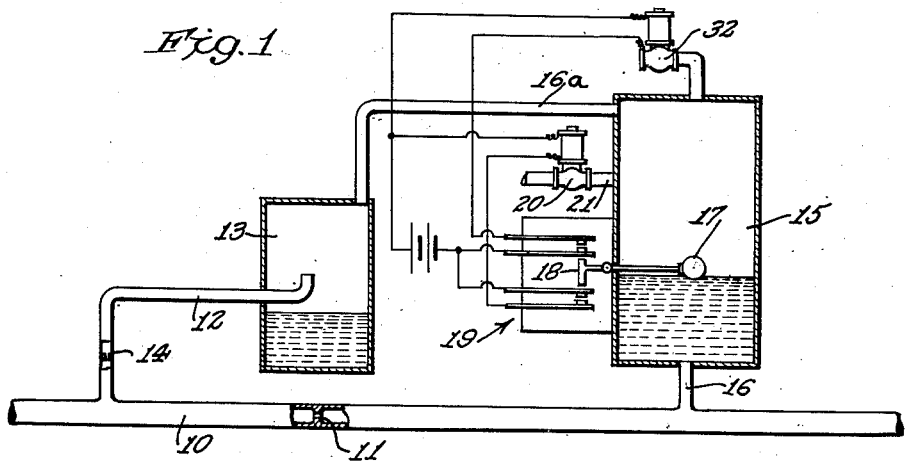

Jan. 22, 1952 E. H. PAULSEN 2,583,060
DIFFERENTIAL PRESSURE SAMPLING DEVICE
Filed Sept. 2, 1944

INVENTOR.
EDWARD H. PAULSEN
BY Hoguet, Henry & Campbell
his ATTORNEYS

Patented Jan. 22, 1952

2,583,060

UNITED STATES PATENT OFFICE 2,583,060

DIFFERENTIAL PRESSURE SAMPLING DEVICE

Edward H. Paulsen, Baltimore, Md.

Application September 2, 1944, Serial No. 552,450

10 Claims. (Cl. 137—166)

This invention relates to liquid proportioning devices. It relates particularly to devices for taking proportional samples of a liquid flowing through a conduit.

Different types of liquid sampling devices have been suggested heretofore, but these devices have not been satisfactory for taking samples of liquids which flow at varying rates and under varying pressures, for example, in such systems as those used in distributing and processing milk in dairies and creameries.

The regulations of various city and State health departments require a dairy or creamery to submit for examination by the health department a representative sample of all the milk, as received, and a second sample of the milk on its way to the pasteurizing department. While such regulations have been in effect for years, it has not been possible for anyone to comply with these regulations for the reason that it was impossible to collect a truly representative sample.

The problem confronting the industry was to withdraw continuously from a pipe or conduit through which milk is flowing, a sample that is exactly proportional to the quantity of milk flowing through the pipe regardless of the pressure in the pipe. Thus, for every gallon of milk that passes through the pipe, a predetermined representative proportion of the milk must be withdrawn as a sample. If the flow in the pipe is stopped, then no sample should be taken. If the pressure in the pipe changes, as it does when a tank is being filled through a bottom connection, no change in the proportion of the sample per gallon of milk flowing through the pipe should occur.

An object of the present invention is to provide a liquid proportioning device that is unaffected by variation in pressure or the rate of flow of the liquid in a flow conduit.

Another object of the invention is to provide a sample taking device which will remove proportional amounts of a liquid flowing through a conduit regardless of variation in pressure or rate of flow of the liquid through the conduit.

Other objects of the invention will become apparent from the following description of typical forms of devices embodying the present invention.

Liquid proportioning devices embodying the present invention include a flow conduit having a restricted orifice therein, a branch conduit also having a restricted orifice therein through which may be withdrawn liquid from the flow conduit or through which liquid may be delivered to the conduit, and a system whereby the pressure drops across the orifices are equalized to cause the rate of flow through the branch conduit to be proportional to the rate of flow of the liquid through the flow conduit.

In a system of the type described above, the flow in the flow conduit is proportional to the square root of the pressure drop across the restricted orifice therein. The flow through the second orifice or the orifice in the branch conduit is proportional to the square root of the same pressure drop. Therefore, the flow through the second orifice is proportional to the flow in the flow conduit. Inasmuch as the flow in each case is solely a function of the pressure drop across the orifice, the flow is not affected by the pressure itself.

In a sample taking device embodying the present invention, the branch conduit is connected to the flow conduit on the upstream side of the orifice in the flow conduit.

The branch conduit is connected to a receptacle which receives liquid from the flow conduit. On the opposite side of the flow conduit orifice from the branch conduit, a chamber is provided for receiving liquid from the flow conduit. In a sampling device, this chamber is a closed chamber into which the liquid from the flow conduit can flow to a level substantially equal to the level at the highest level of the branch conduit.

If wide pressure variations occur in the system, it sometimes is desirable to provide auxiliary means for maintaining the proper level in the liquid receptacle and the pressure chamber. This can be accomplished in various ways, as for example by supplying gas to and discharging gas from the pressure chamber so as to maintain the liquid at a predetermined level.

For a better understanding of the present invention, reference may be had to the accompanying drawings, in which:

Figure 1 is a view in elevation and partly in section illustrating one form of sample taking device embodying the present invention; and Figure 2 is a view in section of a modified form of pressure chamber for establishing the proper level in the sample receiving and the pressure chamber.

One form of sample taking device embodying the present invention is illustrated in Figure 1 of the drawings. This form of device includes a liquid flow conduit 10 which is provided with a restricted orifice 11 across which a pressure drop is created by flow of liquid therethrough. On the upstream side of the orifice 11 is a branch or sample take-off conduit 12 which extends upwardly from the conduit 10. The open upper end of the conduit 12 is disposed within a receptacle 13 adapted to receive a sample of the liquid passing through the flow conduit. The branch or take-off conduit 12 is also provided with a restricted orifice 14 which controls the amount of liquid removed from the flow conduit 10.

In order to render the flow of liquid through the branch conduit 12 proportional to the flow of liquid through the flow conduit 10, it is necessary that the pressure drops across the orifices 11 and 14 should be as nearly equal as possible. To attain such equality, the device is provided with a pressure chamber 15 which is connected by means of a conduit 16 to the flow conduit 10 on the downstream side of the orifice 11. The chamber 15 and the receptacle 13 are connected by means of a pipe 16a whereby the air pressures in these chambers will be equal under all conditions of operation.

When liquid flows through the flow conduit 10, the higher pressure on the upstream side of the orifice 11 forces the liquid through the branch conduit 12 into the receptacle 13, the liquid overflowing the open upper end of the conduit 12. At the same time, the liquid on the downstream side of the orifice 11 flows upwardly into the chamber 15 and under ideal conditions will attain a level equal to the level of the liquid at the upper end of the conduit 12. Under these conditions, an exactly proportional sample of the fluid will be taken in the receptacle 13 for the reason that the pressure drops across the orifices 11 and 14 are exactly the same.

Under some conditions of operation, for example, when filling a tank from the bottom, the pressure of the liquid in the flow conduit 10 will increase, with the result that the level of the liquid in the chamber 15 begins to rise. Such an increase in the level in the chamber 15 will cause a variation in the proportion of the sample taken. In order to overcome this error, means are provided for maintaining a substantially constant level in the chamber 15 regardless of the pressure of the liquid, this level being equal to the level at the point of discharge from the conduit 12.

This objective is attained by providing a float member 17 in the chamber 15 having an arm 18 thereon which controls an electric switch 19. One side of the switch 19 may be connected to a solenoid valve 20 that is connected in a pipe 21 for supplying air or other gas under pressure to the chamber 15. The other side of the switch 19 is connected to a solenoid valve 22 which permits air or gas to escape from the chamber upon opening. Thus, when the level of the liquid in the chamber 15 begins to rise undesirably, the switch 19 is actuated to open the solenoid valve 20 and admit gas under pressure into the chamber 15. The increased gas pressure forces the excess liquid from the chamber 15 until the desired level is attained. If the liquid level in the chamber 15 decreases, the float 17 drops, thereby actuating the switch 19 and opening the solenoid valve 22, permitting air or gas to escape and allowing the level of the liquid in the chamber 15 to rise.

Sample taking devices of the type described above have been found to take very accurate proportional samples in continuous operation and, therefore, are highly effective in enabling the user to determine, for example, the butter fat content and bacteriological count of a composite sample of the various batches of milk flowing continuously through the conduit 10.

The level in the pressure chamber may be controlled in other ways and by other apparatus, for example, the apparatus disclosed in Figure 2. This type of device includes a pressure chamber 35 which is connected by means of a conduit 36 to the flow conduit 37 on one side of the restricted orifice therein (not shown). The pressure chamber 35 is connected by means of a conduit 38 to the sample receiving receptacle so as to maintain equal pressures in these chambers. In the top of the chamber 35 are provided two open valve seats 39 and 40 which may be of conical or tapered form, as illustrated, and which cooperate with tapered or conical valve plugs 41 and 42, respectively. The seat 40 is at the end of the conduit 38 so that it can be closed by the valve plug 42. The valve plugs 41 and 42 are provided with stems 43 and 44, respectively, upon which are mounted the floats 45 and 46, respectively. The length of the stem 43 is such that the valve plug 41 will be seated in the valve seat 39 when the liquid in the chamber 35 exceeds a predetermined level.

The length of the valve stem 44 is less than the length of the valve stem 43 and should be such that the plug 42 seats in the valve seat 40, thereby acting as a check valve when the liquid rises almost to the top of the chamber 35 to prevent escape of the liquid through the conduit 38. Under ordinary conditions the valve 42 and associated elements can be omitted.

In order to control the level of the liquid in the receptacle 35, a continuous supply of air is delivered by the pipe 47 into the upper part of the receptacle 35. The rate of supply of air or other gas through the pipe 47 should be such as to maintain sufficient pressure in both the chamber 35 and the sample-taking receptacle to balance the pressure in the flow conduit. Air or gas will escape through the valve seat 39. However, if the pressure in the flow conduit 27 increases and the liquid begins to rise in the chamber 35 above a predetermined level, the valve plug 41 is seated in its seat 39 and because of the reduced amount of gas escaping from the chamber, a greater air pressure is delivered to the surface of the liquid in the chamber 35, thereby tending to decrease its level. If the liquid pressure is such as to cause the level to increase further, it may rise to a point where the valve 42 seats in its seat 40, thereby causing the entire pressure of the gas to be delivered against the surface of the liquid in the chamber 35 and depressing its level or maintaining it below the level of the conduit 38. In this way, errors in sample taking are avoided and the accuracy of the sample taken is not diminished by a discharge of the liquid from the chamber 35 into the sample taking receptacle.

From the above description of typical forms of devices embodying the invention, it will be apparent that liquid proportioning devices useful for taking samples of continuous flowing liquids have been provided and that these devices operate accurately regardless of the rate of flow of liquid through the conduit or variations in the pressure of the liquid in the conduit.

It will be understood that the above described embodiments of the invention are susceptible to considerable modification and are useful for many purposes and in many industries wherein it is desirable to feed or sample materials in continuous operations. Therefore, the forms of the invention described above should be considered as illustrative and not as limiting the scope of the following claims.

1. An apparatus for sampling liquids comprising a flow conduit for liquids having a restricted orifice therein, a branch conduit having a restricted orifice therein connected to said flow conduit on the upstream side of said flow conduit orifice, a closed liquid receiving receptacle connected to the end of said branch conduit on the opposite side of said orifice therein from said flow conduit and providing a closed air receiving space above said liquid, a chamber for receiving liquid connected to said flow conduit on the opposite side of said flow conduit orifice from said branch conduit and providing a closed air receiving space above said liquid, means connecting the air receiving spaces in said receptacle and said chamber for flow of gas therebetween, and means for maintaining the liquid level in said chamber substantially equal to the highest liquid level in said branch conduit.

2. An apparatus for sampling liquids comprising a flow conduit for liquids having a restricted orifice therein, a branch conduit connected to said flow conduit on the upstream side of said orifice having a restricted orifice therein, a liquid receiving receptacle connected to the end of said branch conduit on the opposite side of said orifice therein from said flow conduit and having a substantially closed space for receiving air above said liquid, a chamber for receiving liquid connected to said flow conduit on the opposite side of said flow conduit orifice from said branch conduit and having a substantially closed space for receiving air above said liquid, means connecting said receptacle and said chamber for flow of gas therebetween to maintain the gas pressure therein equal, and float valve means responsive to variation in the level of the liquid in said chamber for supplying gas to and discharging gas from said chamber to maintain the liquid level in said chamber at an elevation substantially equal to the hydrostatic head acting on the downstream side of the orifice in said branch conduit.

3. A liquid sampling apparatus comprising a flow conduit for liquid having a restricted orifice therein, a sample take-up conduit connected to said flow conduit on the upstream side of said orifice, said take-off conduit having a restricted orifice therein, a receptacle connected to the end of said take-off conduit on the opposite side of said orifice therein from said flow conduit for receiving liquid therefrom and having a substantially closed air space therein above the level of said liquid, a chamber connected with said flow conduit on the downstream side of said orifice therein for receiving liquid from said flow conduit and having a substantially closed air space therein above the level of said liquid, float-controlled means to maintain the liquid level in said chamber at an elevation about equal to the hydrostatic head acting on the downstream side of said orifice in said branch conduit, and means connecting said receptacle and said chamber for flow air therebetween to maintain substantially equal air pressures in said chamber and said receptacle.

4. A liquid sampling apparatus comprising a flow conduit for liquid having a restricted orifice therein, a sample take-off conduit connected to said flow conduit on the upstream side of said orifice, said take-off conduit having a restricted orifice therein, a receptacle connected to the end of said take-off conduit on the opposite side of said orifice therein from said flow conduit for receiving liquid therefrom and having a substantially closed air receiving space therein above the level of said liquid, a chamber connected with said flow conduit on the downstream side of said orifice therein for receiving liquid from said flow conduit and having a substantially closed air receiving space therein above the level of said liquid, means connecting said air receiving spaces in said receptacle and said chamber for flow of air therebetween to maintain the air pressure therein substantially equal, and means responsive to variation in the level of the liquid in said chamber for supplying air to and discharging air from said chamber to maintain the liquid level in said chamber at an elevation about equal to the hydrostatic head acting on the downstream side of the orifice in said branch conduit.

5. A liquid sampling apparatus comprising a flow conduit for liquid having a restricted orifice therein, a sample take-off conduit connected to said flow conduit on the upstream side of said orifice, said take-off conduit having a restricted orifice therein, a receptacle communicating with said take-off conduit for receiving liquid therefrom and having a closed air receiving space therein above said liquid, a chamber connected with said flow conduit on the downstream side of said orifice therein for receiving liquid from said flow conduit and having a closed air receiving space therein above said liquid, means connecting said receptacle and said chamber for flow of gas therebetween, a source of gas under pressure, means including a valve for introducing gas into said chamber, means including a valve for discharging gas from said chamber, and means including a float in said chamber for controlling said valves to maintain the level of the liquid in said chamber substantially equal to the highest level of the liquid in said take-off conduit.

6. A liquid sampling apparatus comprising a flow conduit for liquid having a restricted orifice therein, a sample take-off conduit connected to said flow conduit on the upstream side of said orifice, said take-off conduit having a restricted orifice therein, a liquid receiving receptacle connected to the end of said take-off conduit on the downstream side of said orifice therein for receiving liquid therefrom and having a substantially closed gas receiving space above said liquid, a chamber connected with said flow conduit on the downstream side of said orifice therein for receiving liquid from said flow conduit and having a substantially closed gas receiving space therein above said liquid, said receptacle and said chamber having their bottoms located in about the same horizontal plane below the highest level of the take-off conduit, said chamber having its top above the highest level of the take-off conduit, to permit the liquid level in said chamber to rise to at least as high level as the highest level of said take-off conduit, means connecting said receptacle and said chamber for flow of gas therebetween to maintain substantially equal gas pressures on the surfaces of the liquid in said chamber and said receptacle, and means to vary the pressure in the chamber in response to the liquid level therein so that the resulting pressure adjusts the level to a height which is at least as high as the highest level of the take-off conduit.

7. A liquid sampling apparatus comprising a flow conduit for liquid having a restricted orifice therein, a sample take-off conduit connected to said flow conduit on the upstream side of said orifice, said take-off conduit having a restricted orifice therein, a substantially closed receptacle connected to the end of said take-off conduit on the downstream side of the orifice therein for receiving liquid therefrom, a substantially closed chamber connected with said flow conduit on the downstream side of said orifice therein for receiving liquid from said flow conduit, means connecting said receptacle and said chamber for flow of gas therebetween to maintain substantially equal gas pressure on the surfaces of the liquid in said chamber and said receptacle, means for supplying a gas under pressure to said chamber, a gas escape valve in said chamber, and float means in said chamber for closing and opening said valve to maintain the liquid level in said chamber at an elevation about equal to the hydrostatic head acting on the downstream side of the orifice in said take-off conduit.

8. A sampling apparatus comprising a liquid flow conduit having a restricted orifice therein, a substantially closed liquid receiving receptacle, a branch conduit connecting said receptacle to said flow conduit at the upstream side of said restricted orifice, said branch conduit having a restricted orifice therein, a substantially closed liquid receiving chamber, a second branch conduit connecting said chamber and said flow conduit on the downstream side of said orifice for flow of liquid therebetween, said receptacle and said chamber having closed gas receiving spaces above the liquid therein, means for supplying gas under pressure to and discharging gas from said chamber, means to control said gas supplying and gas discharging means to maintain the sum of the gas pressure and hydrostatic head in said chamber substantially equal to the pressure on said downstream side of said flow conduit orifice and means connecting said receptacle and said chamber to maintain the gas pressures therein equal under all pressure conditions in said flow conduit.

9. A sampling apparatus comprising a liquid flow conduit having a restricted orifice therein, a liquid receiving chamber having a closed space above the liquid therein to receive gas, means interposed between said chamber and said flow conduit on the downstream side of said orifice for supplying liquid from said flow conduit to said chamber, means for supplying gas under pressure to said chamber, means in said chamber for discharging gas from said chamber, a valve for controlling the rate of gas discharge from said chamber, and float control means connected to said valve and responsive to increase in the liquid level, above a predetermined level in said chamber to actuate said valve to decrease the rate of gas discharge from said chamber, said float controlled means also actuating said valve to increase the rate of gas discharge, in response to decrease in the liquid level below said predetermined level, said valve and float controlled means thereby maintaining a substantially constant liquid level in said chamber and the sum of the gas pressure and hydrostatic head in said chamber substantially equal to the hydrostatic pressure on said downstream side of said flow conduit orifice.

10. A liquid sampling device comprising a flow conduit having a restricted orifice therein, a liquid receiving chamber connected to said conduit at the downstream side of said orifice for flow of liquid between said conduit and said chamber, a closed gas space in said chamber above the level of the liquid in said chamber, means for supplying gas continuously to said gas space to maintain gas pressure therein, a valve for releasing gas from said gas space, means responsive to the level of the liquid in said chamber to control said valve to establish a balance between the amount of gas entering and leaving said chamber to maintain the liquid in said chamber at substantially a constant level.

EDWARD H. PAULSEN.

REFERENCES CITED

The following references are of record in the file of this patent:

UNITED STATES PATENTS

| Number | Name | Date |
|---|---|---|
| 1,842,153 | Duden | Jan. 19, 1932 |
| 1,999,834 | Ernst | Apr. 30, 1935 |
| 2,212,374 | Louis | Aug. 20, 1940 |